(12) United States Patent
Barker et al.

(10) Patent No.: US 7,910,636 B2
(45) Date of Patent: Mar. 22, 2011

(54) MULTIPHASE ACRYLIC ADHESIVES

(75) Inventors: Pauline Barker, Stapleford (GB); Dimiter Lubomirov Kotzev, Basel (CH)

(73) Assignee: Huntsman International LLC, The Woodlands, TX (US)

( * ) Notice: Subject to any disclaimer, the term of this patent is extended or adjusted under 35 U.S.C. 154(b) by 251 days.

(21) Appl. No.: 12/097,370

(22) PCT Filed: Dec. 5, 2006

(86) PCT No.: PCT/EP2006/069314
§ 371 (c)(1),
(2), (4) Date: Jun. 13, 2008

(87) PCT Pub. No.: WO2007/068625
PCT Pub. Date: Jun. 21, 2007

(65) Prior Publication Data
US 2008/0302479 A1 Dec. 11, 2008

(30) Foreign Application Priority Data
Dec. 15, 2005 (EP) .................. 05112193

(51) Int. Cl.
*C08L 33/00* (2006.01)

(52) U.S. Cl. ............ 523/201; 524/523; 524/524
(58) Field of Classification Search .......... 523/201; 524/523, 524
See application file for complete search history.

(56) References Cited

U.S. PATENT DOCUMENTS

| | | | | |
|---|---|---|---|---|
| 4,942,201 A | * | 7/1990 | Briggs et al. | 525/71 |
| 5,266,402 A | | 11/1993 | Delgado et al. | |
| 5,266,610 A | * | 11/1993 | Malhotra et al. | 523/201 |
| 5,997,682 A | * | 12/1999 | Goodman et al. | 156/273.7 |

FOREIGN PATENT DOCUMENTS

| EP | 349216 A | * | 1/1990 |
|---|---|---|---|
| WO | WO 92/11334 | | 7/1992 |

* cited by examiner

*Primary Examiner* — Vickey Nerangis

(57) ABSTRACT

The invention relates to cured (meth)acrylate based adhesive composition, comprising at least two co-continuous phases of interpenetrating networks and at least two types of polymeric inclusions, in which one of the co-continuous phases comprises a polymer or copolymer based on at least one acrylic or methacrylic acid monomer or a derivative thereof. These compositions exhibit better facture toughness, especially at low temperatures.

8 Claims, 4 Drawing Sheets

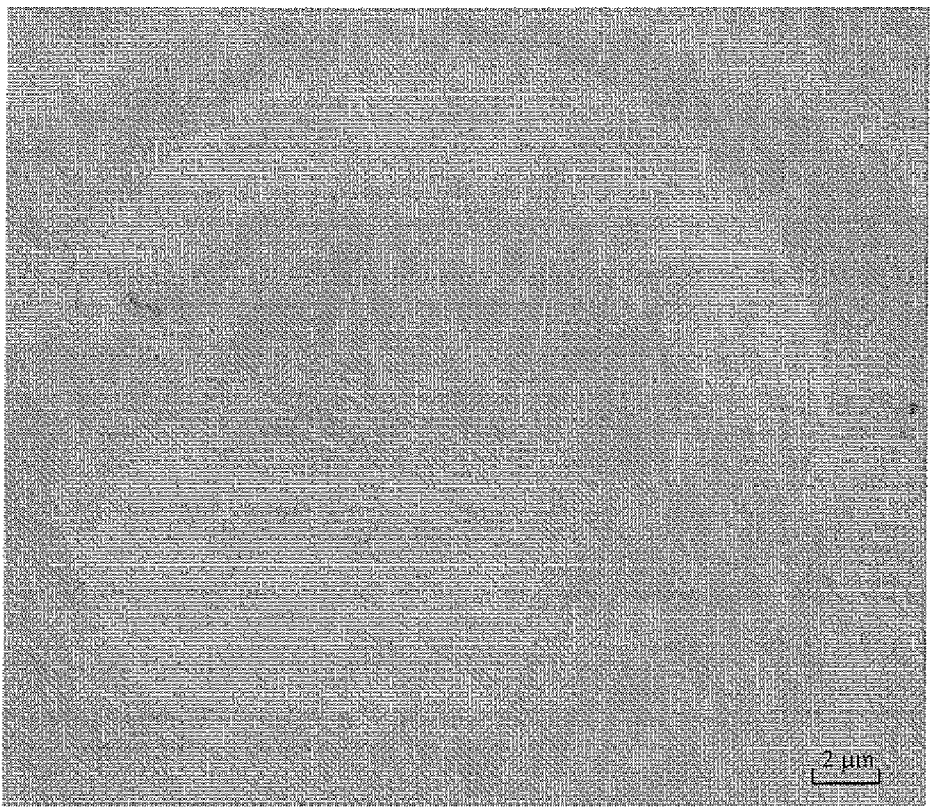
Figure 1  TEM photograph of Comparative Example 1, circular marking on photograph is degradation caused by electron beam (magnification x4600)

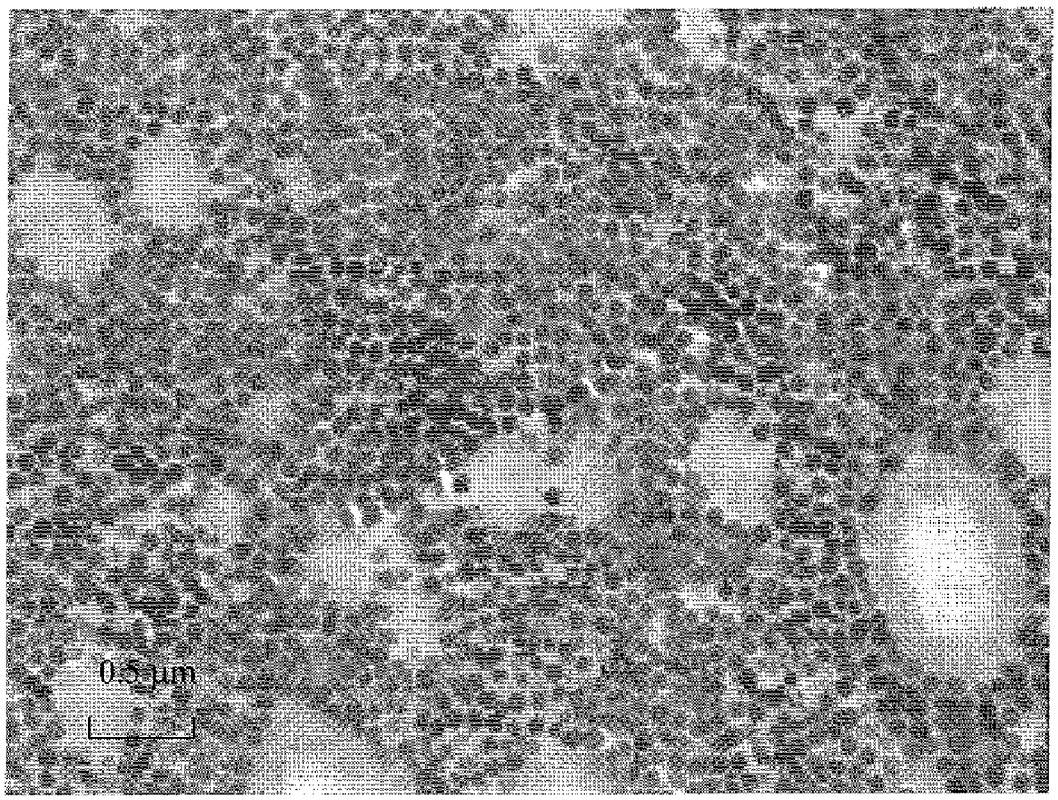
Figure 2 TEM Photograph of Comparative Example 4 (magnification x11000)

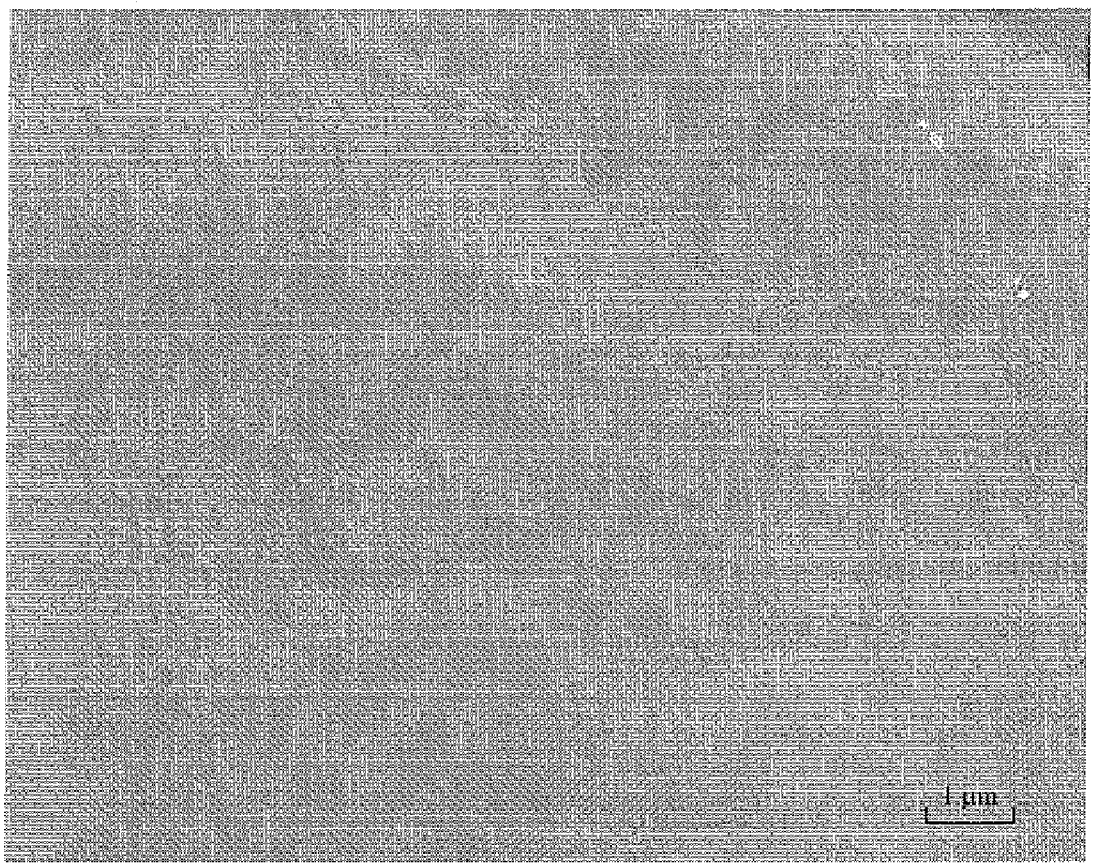
Figure 3  TEM Photograph of Comparative Example 4 (magnification x11000)

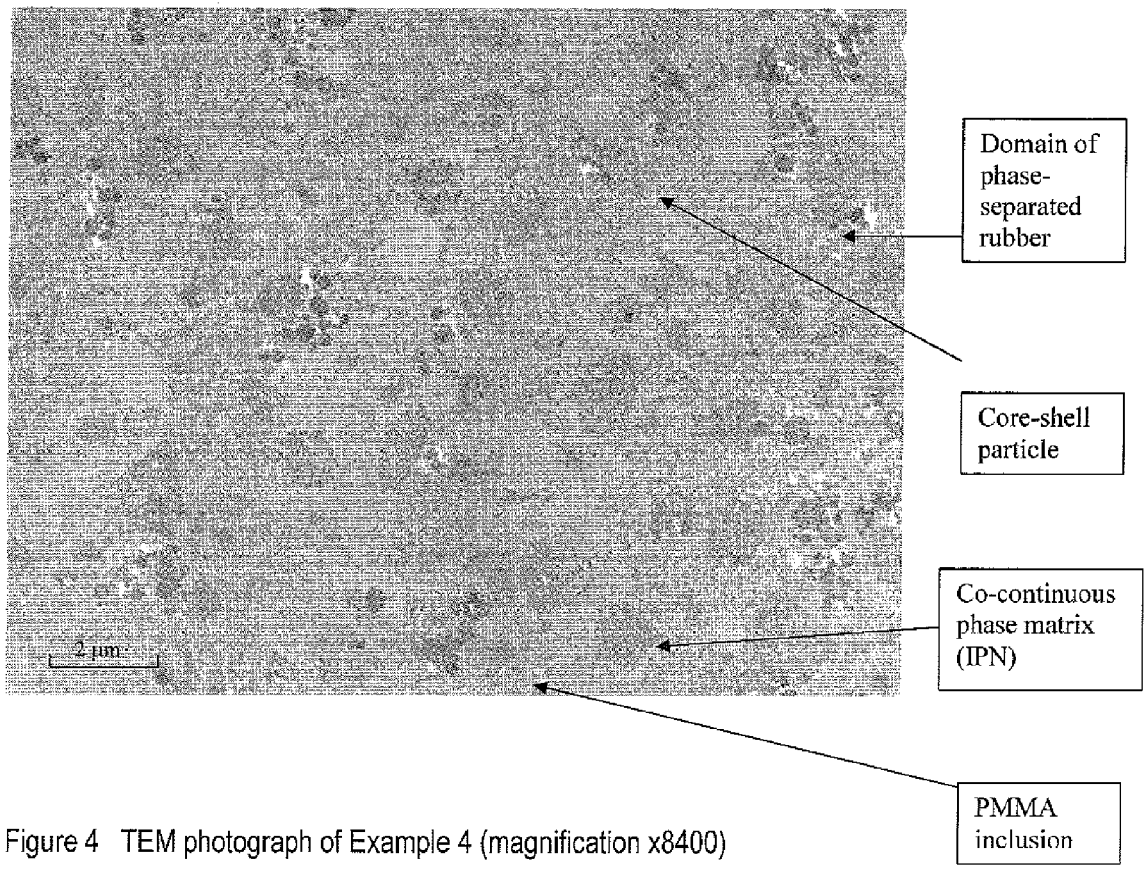
Figure 4 TEM photograph of Example 4 (magnification x8400)

MULTIPHASE ACRYLIC ADHESIVES

CROSS REFERENCE TO RELATED APPLICATIONS

This application is the National Phase of International Application PCT/EP2006/069314 filed Dec. 5, 2006 which designated the U.S. and which claims priority to European Pat. App. No. 05112193.7 filed Dec. 15, 2005. The noted application is incorporated herein by reference.

The present invention relates to uncured and to cured acrylic adhesives, the latter of which comprise at least two different types of polymeric networks and at least two types of inclusions. The cured adhesives show enhanced fracture toughness.

BACKGROUND OF THE INVENTION

Acrylic adhesives cure by free-radical polymerisation of unsaturated compounds, most often esters of methacrylic acid. Acrylic adhesives have the advantage of fast room temperature cure, fast strength build-up, good adhesion to a wide range of substrates. However, often the methacrylic acid ester monomers yield brittle polymers. In order to achieve structural adhesive bonds, the acrylic adhesive has to be toughened. This is usually achieved by addition of impact modifiers to the adhesive formulation. Examples are polychloroprene (U.S. Pat. No. 3,333,025), styrene-butadiene-styrene (U.S. Pat. No. 4,182,644), core-shell polymer particles (U.S. Pat. No. 4,942,201), chlorosulfonated polyethylene (U.S. Pat. No. 4,106,971), polyurethane oligomers with methacrylic functionality (U.S. Pat. No. 3,873,640), methacrylic functionalised butadiene rubbers (U.S. Pat. No. 4,769,419).

There exists the need for acrylic adhesives with enhanced toughness, particularly at sub-ambient temperature.

BRIEF DESCRIPTION OF THE DRAWINGS

FIG. 1 depicts a TEM photograph of Comparative Example 1;
FIG. 2 depicts a TEM photograph of Comparative Example 4;
FIG. 3 depicts a TEM photograph of Comparative Example 4;
FIG. 4 depicts a TEM photograph of Example 4.

DETAILED DESCRIPTION OF THE INVENTION

A. Morphology of the Cured Composition

A first object of the present invention is to provide a cured (meth)acrylate based adhesive composition, comprising at least two co-continuous phases of interpenetrating networks and at least two types of polymeric inclusions, one of the co-continuous phases comprising a polymer or copolymer of at least one acrylic or methacrylic acid monomer or a derivative thereof.

Cured acrylic adhesive compositions according to the present invention with the outlined morphology show improved fracture toughness, especially at sub-ambient temperatures and particularly as low as −40° C.

Co-Continuous Phases and IPNs

As used herein, the expression co-continuous means that the distinction between the disperse and continuous phases of polymer blends becomes difficult, as each phase becomes continuous in space. Depending upon the materials of choice, there may also be regions where the first phase appears to be dispersed within the second, and vice versa. For a description of a variety of co-continuous morphologies and for methods of evaluating, analyzing, and characterizing them, see Sperling and the references cited therein (L. H. Sperling, Chapter 1 "Interpenetrating Polymer Networks: An Overview", *Interpenetrating Polymer Networks*, edited by D. Klempner, L. H. Sperling, and L. A. Utracki, Advances in Chemistry Series #239, 3-38, 1994). Each polymer is in the form of a continuous structure, wherein the structures of each polymer are intertwined with one another to form a co-continuous macrostructure. Each structure remains independent of the other even though intertwined. Materials having co-continuous phases may be made by a number of different methods. Thus, for example, the polymeric first phase material may be mechanically blended with the polymeric second phase material to achieve a co-continuous system. Co-continuous phases may also be formed by first dissolving them out of supercritical fluid extractions, and then allowing them to phase separate following exposure to heat and/or mechanical shear.

Several methods and their combinations can identify co-continuous phase structures. One of the methods is thermal analysis, in particular dynamic mechanical thermal spectroscopy and differential scanning calorimetry. The shifts and/or broadening of the individual polymers' thermal transitions are an indication of the degree of miscibility and/or dispersity of the phases. When the phase separation is on a nanoscale level (less than 100 nm) the co-continuous phases behave like an interphase that has a glass transition temperature between that of the two components. Another reliable method for identification of co-continuous phase structure is transmission electron microscopy (TEM) of microtomed sections of the cured adhesive. Staining of the sample with osmium tetroxide helps visually to distinguish between the phases.

Co-continuous phases in accordance with the present invention are also obtained through the creation of interpenetrating polymer networks (IPNs).

As used herein, the expression interpenetrating network means a polymer or copolymer comprising two or more networks which are at least partially interlaced on a molecular scale.

Some of the more important IPNs, include simultaneous IPNs, sequential IPNs, gradient IPNs, latex IPNs, thermoplastic IPNs, and semi-IPNs. These and other types of IPNs, their physical properties (e.g., phase diagrams), and methods for their preparation and characterization, are described, for example, in L. H. Sperling, "Interpenetrating Polymer Networks: An Overview", *Interpenetrating Polymer Networks*, edited by D. Klempner, L. H. Sperling, and L. A. Utracki, Advances in Chemistry Series #239, 3-38, 1994.

Simultaneous IPNs can be made by mixing together the respective monomers or prepolymers, plus the crosslinkers and activators, of two or more polymer networks. The respective monomers or prepolymers are then reacted simultaneously, but in a non-interfering manner. Thus, for example, one reaction may be made to proceed by way of chain polymerization kinetics, and the other reaction may be made to proceed through step polymerization kinetics.

Sequential IPNs are made by first forming an initial polymer network. Then, the monomers, crosslinkers, and activators of one or more additional networks are swollen into the initial polymer network, where they are reacted in situ to yield additional polymer networks.

Gradient IPNs are synthesized in such a manner that the overall composition or crosslink density of the IPN varies macroscopically in the material from one location to another. Such systems may be made, for example, by forming a first polymer network predominantly on one surface of a film and a second polymer network predominantly on another surface of the film, with a gradient in composition throughout the interior of the film.

Latex IPNs are made in the form of latexes (e.g., with a core and shell structure). In some variations, two or more latexes may be mixed and formed into a film, which crosslinks the polymers.

Thermoplastic IPNs are hybrids between polymer blends and IPNs that involve physical crosslinks instead of chemical crosslinks. As a result, these materials can be made to flow at elevated temperatures in a manner similar to that of thermoplastic elastomers, but are crosslinked and behave as IPNs at the temperatures of normal use.

Semi-IPNs are compositions of two or more polymers in which one or more of the polymers are crosslinked and one or more of the polymers are linear or branched.

Co-continuity can be achieved in multicomponent systems as well as in binary systems.

Polymers and Monomers

At least one of the co-continuous phases, preferably two co-continuous phases of the present invention—as well as the inclusions—are polymers of acrylic and/or methacrylic acid or of derivatives thereof. In a preferred embodiment of the invention, the derivatives are the a) esters of acrylic acid and/or methacrylic acid with mono-, di- and polyols, b) esters of acrylic acid and/or methacrylic acid with hydroxyl functionalized polyethers, c) esters of acrylic acid and/or methacrylic acid with hydroxyl functionalized polyesters, d) esters of acrylic acid and/or methacrylic acid with hydroxyl functionalized cycloaliphatic and aromatic compounds. These derivatives may contain additional polymerisable functional groups. The suitable derivatives may also be oligomers or polymers with acrylic groups, which can be polymerized via radical polymerization.

Examples of suitable monomers resulting in said polymers are methyl methacrylate, methyl acrylate, butyl methacrylate, t-butyl methacrylate, 2-ethylhexyacrylate, 2-ethylhexyl-methacrylate, ethyl acrylate, isobornyl methacrylate, isobornyl acrylate, 2-hydroxyethyl methacrylate, glycidyl methacrylate, tetrahydrofurfuryl methacrylate, acrylamide, n-methyl acrylamide. Further examples include acrylate or methacrylate containing monomers which are mono- or poly-functionalized and which apart from hydroxyl groups contain amide-, cyano-, chloro- and silane substituents. Certain acrylic or methacrylic monomer combinations were found to be particularly advantageous according to the invention in providing polymerizable compositions having less odour. Such monomer combinations preferably comprise a) 10-90% b.w. based on the total weight of the monomer blend of tetrahydrofurfuryl methacrylate; b) 5-80% b.w. based on the total weight of the monomer blend of at least one monomer selected from the group consisting of 2-ethylhexyl methacrylate, 2-ethylhexyl methacrylate, 2-ethoxyethyl methacrylate, cyclohexyl methacrylate, isobornyl methacrylate, isooctyl acrylate and isooctyl methacrylate; and c) 0-70% b.w. based on the total weight of the monomer blend of at least one monomer selected from the group consisting of isobutyl methacrylate, n-butyl methacrylate, cyclohexyl methacrylate, cyclohexyl acrylate, n-hexyl methacrylate, isobornyl methacrylate, isodecyl methacrylate and isodecyl acrylate.

A class of polymerizable monomers/oligomers useful for the present invention correspond to the following general formula:

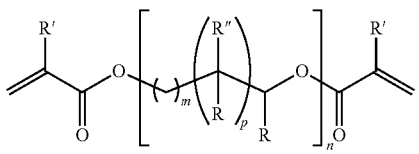

wherein R is selected from the group consisting of hydrogen methyl, ethyl, —CH$_2$OH, and

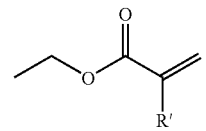

R' is selected from the group consisting of chlorine, methyl and ethyl; R" is selected from the group consisting of hydrogen, hydroxyl and

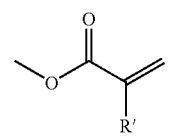

m is an integer equal to at least 1, e.g. from 1 to 8 or higher and preferably from 1 to 4 inclusive; n is an integer equal to at least 1, e.g. from 1 to 20 or more; and p is 0 or 1. Monomers that come within the above general formula include for example, ethylene glycol dimethacrylate, ethylene glycol diacrylates, polyethylene glycol diacrylates, tetraethylene glycol dimethacrylate, diglycerol diacrylates, diethylene glycol dimethacrylate, pentaerythritol triacrylate, trimethylpropane trimethacrylate and other polyether diacrylates and dimethacrylates. This class of materials is described in essence in U.S. Pat. No. 5,106,928 and U.S. Pat. No. 3,043,820.

Another class of polymerizable monomers useful to build said polymers corresponds to the following general formula:

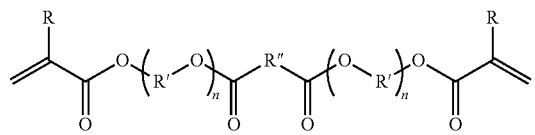

wherein R represents hydrogen, chlorine, methyl, or ethyl, R' represents alkylene with 2-6 carbon atoms; and R" represents (CH$_2$)$_m$ in which m is an integer of from 0 to 8, or

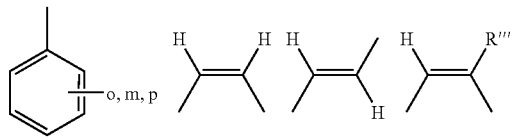

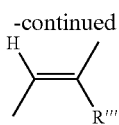

n represents an integer of from 1 to 4 and R''' is methyl. Typical monomers of this class include, for example dimethylacrylate of bis(ethylene glycol) adipate, dimethylacrylate of bis(ethylene glycol)maleate, dimethylacrylate of bis(ethylene glycol) phthalate, dimethylacrylate of bis(tetraethylene glycol) phthalate, dimethylacrylate of bis(tetraethylene glycol) sebacate, dimethylacrylates of bis(tetraethylene glycol) maleate and the diacrylates and chloroacrylates corresponding to said dimethacrylates and the like. This class of polymerizable monomers are described in essence in U.S. Pat. No. 5,106,928 and U.S. Pat. No. 3,457,212.

Another useful class of polymerizable compounds of the present invention include monomers that are isocyanate-hydroxyacrylate or isocyanate-aminoacrylate reaction products. Typical useful compounds of this class include the reaction product of mono- or poly-isocyanate, for example, toluene diisocyanate, with an acrylate ester containing a hydroxy or an amino group in the non-acrylate portion thereof, for example, hydroxyethyl methacrylate. The above class of monomers are described in essence in U.S. Pat. No. 5,106,928.

Another class of monomers/oligomers/polymers useful herein are the mono- and polyacrylate esters and methacrylate esters of bisphenol-type compounds many of which are widely available. These compounds can be described by the following formula:

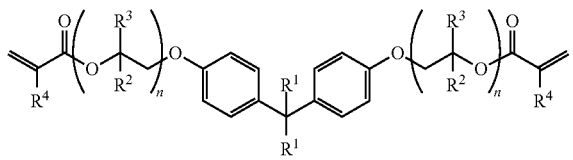

where $R^1$ is methyl, ethyl, carboxyalkyl or hydrogen; $R^2$ is hydrogen, methyl or ethyl; $R^3$ is hydrogen, methyl or hydrogen; $R^4$ is hydrogen, chlorine, methyl or ethyl, and n is an integer having a value of 0 to 8. Representative monomers of the above-described class include: dimethacrylate and diacrylate esters of 4,4'-bis-hydroxyethoxy-bisphenol A, dimethacrylate and diacrylates ester of bisphenol A, etc. These monomers are essentially described in U.S. Pat. No. 5,106,928.

The (meth)acrylates suitable for the present invention are known compounds and some are commercially available, for example from the SARTOMER Company under product designations such as SR®203, SR®295, SR®350, SR®351, SR®367, SR®399, SR®444, SR®454 or SR®9041.

Suitable examples of di(meth)acrylates are the di(meth) acrylates of cycloaliphatic or aromatic diols such as 1,4-dihydroxymethylcyclohexane, 2,2-bis(4-hydroxy-cyclohexyl)propane, bis(4-hydroxy-cyclohexyl)methane, hydroquinone, 4,4'-dihydroxybiphenyl, Bisphenol A, Bisphenol F, Bisphenol S, ethoxylated or propoxylated Bisphenol A, ethoxylated or propoxylated Bisphenol F or ethoxylated or propoxylated Bisphenol S. Di(meth)acrylates of this kind are known and some are commercially available.

Examples of commercially available products of polyfunctional monomers are the KAYARAD® series with R-526, HDDA, NPGDA, TPGDA, MANDA, R-551, R-712, R-604, R-684, PET-30, GPO-303, TMPTA, THE-330, DPHA-2H, DPHA-2C, DPHA-21, D-310, D-330, DPCA-20, DPCA-30, DPCA-60, DPCA-120, DN-0075, DN-2475, T-1420, T-2020, T-2040, TPA-320, TPA-330, RP-1040, R-011, R-300, R-205, from Nippon Kayaku Co., Ltd.; the Aronix® series with M-210, M-220, M-233, M-240, M-215, M-305, M-309, M-310, M-315, M-325, M-400, M-6200, M-6400 from Toagosei Chemical Industry Co, Ltd. Further examples include Light Acrylate® BP-4EA, BP-4PA, BP-2EA, BP-2PA, DCP-A by Kyoeisha Chemical Industry Co., Ltd.; New Frontier® BPE-4, TEICA, BR-42M, GX-8345 form Daichi Kogyo Seiyaku Co., Ltd.; ASF-400 from Nippon Steel Chemical Co.; Ripoxy® SP-1506, SP-1507, SP-1509, VR-77, SP-4010, SP-4060 from Showa Highpolymer Co., Ltd.; NK Ester A-BPE-4 form Shin-Nakamura Chemical Industry Co., Ltd.; SA-1002 from Mitsubishi Chemical Co., Ltd.; the Viscoat® series Viscoat-195, Viscoat-230, Viscoat-260, Viscoat-310, Viscoat-214HP, Viscoat-295, Viscoat-300, Viscoat-360, Viscoat-GPT, Viscoat-400, Viscoat-700, Viscoat-540, Viscoat-3000, Viscoat-3700 form Osaka Organic Chemical Industry Co., Ltd.

Other suitable (meth)acrylates are those in which the free radically curable component contains a tri(meth)acrylate or a penta(meth)acrylate. Examples of suitable aromatic tri(meth) acrylates are the reaction products of triglycidyl ethers of trihydric phenols and phenol or cresol novolacs containing three hydroxyl groups, with (meth)acrylic acid.

Another class of (meth)acrylate monomers are esters of a hydroxyl functionalized (meth)acrylate with phosporic, phosphonic, and phosphinic acids. Examples of such compounds are 2-methacryloyloxyethyl phosphate, bis-(2-methacryloyoloxyethyl)phosphonate, 2-acryloyoloxyethyl phosphate, bis-(2-acryloyoloxyethyl)phosphonate).

In a preferred embodiment of the cured composition, the co-continuous phase comprises a combination of a polymer of methacrylic acid or a derivative thereof and an acrylate- or methacrylate-derivatised polyurethane. Methacrylic acid polymers and useful monomers were described above. Polymers of methyl methacrylic acid are most preferred. Typically, the derivatised polyurethanes are reaction products of polyether or polyester polyols with difunctional isocyanates wherein the intermediate products contains free isocyanate groups. Hydroxyfunctional (meth)acrylates subsequently are reacted with the isocyanate functionality of the above product yielding (meth)acrylate functional oligomer or polymer.

In a further preferred embodiment of the cured composition, the other co-continuous phase comprises a rubber polymer, preferably carboxylated butadiene acrylonitrile rubber. As used herein, rubber means an elastomeric polymer or copolymer with a glass transition temperature below −15° C. Preferred rubber polymers according to the present invention are homopolymers or copolymers of butadiene or of derivatives thereof. Preferably, the cured composition comprises one co-continuous phase which comprises a combination of a polymethacrylate and a methacrylated polyurethane and a second co-continuous phase which comprises a carboxylated butadiene-nitrile rubber. Examples of other rubber materials are polychloroprene, polyisoprene, polybutadiene rubbers and their copolymers.

Polymeric Inclusions

The polymeric inclusions can be of particulate nature (preformed particles) and of domain type nature. The latter often result from phase separation into the matrix during cure. The polymeric inclusions can themselves be composed of multiple phases.

In a preferred embodiment of the present invention, at least one type of the polymeric inclusions is of particulate nature, preferably with an average diameter of 20-400 nm.

Preferably, the polymeric inclusions of particulate nature are core-shell particles. These are preformed polymeric particles consisting of a soft, elastomeric core and a hard, thermoplastic shell. They are usually obtained via graft copolymerisation. A typical example for an ABS core shell particle comprises a poly(butadiene-co-styrene) rubber core and poly(styrene-co-acrylonitrile) shell. A typical example for a MBS core shell particle comprises a styrene-butadiene core and a shell of (meth)acrylic polymer or copolymer. A typical example for an acrylic core-shell particle comprises a core of butyl methacrylate polymer or copolymer and a shell of poly(methylmethacrylate). A typical example for a silicone core-shell particle comprises a polysiloxane core and poly(meth)acrylic shell. Many grades of core shell-particles are commercially available and used as impact modifiers for plastics. When incorporated into the uncured adhesive compositions of the present invention, the shell preferably dissolves or swells in the (meth)acrylate monomers of the adhesive, which after adhesive cure ensures good connection between the adhesive matrix and the rubber core of the particle. In a preferred embodiment of the cured composition, the core shell particles comprise poly(methylmethacrylate-co-butadiene-co-styrene), poly(acrylonitrile-co-butadiene-co-styrene), polystyrene-block-polybutadiene-block-polystyrene or polystyrene-block-polybutadiene-block-poly-methylmethacrylate, poly(siloxane-co-methylmethacrylate), poly(butylmethacrylate-co-methylmethacrylate) or any mixture thereof.

In a further preferred embodiment of the cured composition, at least one type of polymeric inclusion is of domain-type nature. As used herein, the expression "domain" is used for a region of material that is uniform in chemical composition and physical state. These regions can differ considerably in sizes (e.g. phase microdomain and phase nanodomain).

Preferably, the polymeric inclusions of the domain-type nature result from phase separation during adhesive cure. In this case, the polymers which form the IPNs could also form the phase-separated polymeric inclusions. Domains can also be formed as a result of solubility changes during adhesive cure. Polymers, rubbers and oligomers which were soluble in the adhesive before cure could become insoluble during cure and phase separate into domains in the cured adhesive. In a preferred embodiment, the polymeric inclusions of the domain type have an average diameter ranging between 100 nm and 10 microns.

In a further preferred embodiment, the polymeric inclusions of domain-type nature comprise polymers selected from rubber, preferably carboxylated butadiene-acrylonitrile rubber—poly(meth)acrylate homo- or copolymer, polyurethane homo- or copolymer, polysiloxane homo- or copolymer, polyolefin homo- or copolymer or a mixture thereof.

Most preferably, the polymeric inclusions are a combination of core shell particles and phase separated polymers.

Significant and unusual toughening is achieved from those polymeric inclusions which are a mixture of above types with a variety of physical dimensions, ranging from, for example, spherical particles of 20-200 nanometers in diameter, individually dispersed or dispersed as agglomerates of particles measuring an average of 500 nm, combined with phase separated spherical rubber domains of sizes in the 100 nm 1-micron range, and spherical domains of polymethylmethacrylate with size 1 to 3 microns.

The cured adhesive composition of the present invention, which has the morphology as described herein, is characterised by enhanced toughness, for example measured as fracture toughness at −40° C. and notched Izod impact strength at 23° C. It was surprisingly found that the compositions of the present invention yield even stronger adhesives at lower temperatures, e.g. as low −40° C., compared to corresponding performance at ambient temperature. A further object of the present invention is the use of cured composition according to claims 1 to 11 to improve fracture toughness, in particular fracture toughness at temperatures below freezing and especially at −40° C.

B. Uncured Adhesive Composition

A further object of the present invention is to provide an uncured polymerizable composition, comprising (A) 1-25% b.w. of the total composition of a rubber, (B) 25-75% b.w. of the total composition of a monomer or monomer blend comprising acrylic or methacrylic acid or a derivative thereof (C) 1-50% b.w. of the total composition of a polyurethane or a meth(acrylated) polyurethane, and (D) at least one type of core shell particle. Upon cure, these compositions exhibit improved fracture toughness. In a preferred embodiment of the invention, these uncured compositions yield a cured composition with the morphology according to claims 1 to 11. The expressions used for the components in (A), (B), (C) and (D) were defined above, under section A, where the morphology of the cured composition was discussed.

In a preferred embodiment, the uncured, polymerizable composition comprises the core shell particles in an amount of 0.1 to 30% b.w. of the total composition. In a further preferred embodiment, the uncured, polymerizable composition also comprises at least one tertiary amine. Preferably, the tertiary amine is present in an amount of 0.5-7% b.w. of the total composition. Suitable tertiary amines are aromatic tertiary amines. Preferred tertiary amines are dihydroxyethyl p-toluidine, diisopropyl p-toluidine, dimethyl p-toluidine, N,N-dimethylaniline, 2,4,6-tris[(dimethyl-amino)methyl] phenol.

Preferred embodiments of the uncured polymerizable compositions comprise (A) 5-20% b.w. of the total composition of a rubber, (B) 30-70% b.w. of the total composition of a monomer or monomer blend comprising acrylic or methacrylic acid or a derivative thereof (C) 10-40% b.w. of the total composition of a polyurethane or a meth(acrylated) polyurethane, (D) 1-20% b.w. of at least one type of core shell particle. Especially preferred embodiments comprise (A) 10-15% b.w. of the total composition of a rubber, (B) 40-60% b.w. of the total composition of a monomer or monomer blend comprising acrylic or methacrylic acid or a derivative thereof (C) 25-35% b.w. of the total composition of a polyurethane or a meth(acrylated) polyurethane, (D) 2-10% b.w. of at least one type of core shell particle.

Preferred monomers and oligomers are those cited in the section "Polymers and monomers". For the purpose of complete disclosure, it is referred back to this section.

Preferred derivatives of component (B) are—as outlined before—a) esters of acrylic acid and/or methacrylic acid with mono-, di- and polyols, b) esters of acrylic acid and/or methacrylic acid with hydroxyl functionalized polyethers, c) esters of acrylic acid and/or methacrylic acid with hydroxyl functionalized polyesters, d) esters of acrylic acid and/or methacrylic acid with hydroxyl functionalized cycloaliphatic and aromatic compounds. These derivatives may contain additional polymerisable functional groups.

As outlined before, certain acrylic or methacrylic monomer combinations were found to be particularly advantageous as component (B) in providing polymerizable compositions having less odor. Such monomer combinations preferably comprise a) 10-90% b.w. based on the total weight of the monomer blend of tetrahydrofurfuryl methacrylate; b) 5-80% b.w. based on the total weight of the monomer blend of at least one monomer selected from the group consisting of 2-ethylhexyl methacrylate, 2-ethylhexyl methacrylate, 2-ethoxyethyl methacrylate, cyclohexyl methacrylate, isobornyl methacrylate, isooctyl acrylate and isooctyl methacrylate; and c) 0-70% b.w. based on the total weight of the monomer blend of at least one monomer selected from the group consisting of isobutyl methacrylate, n-butyl methacrylate, cyclohexyl methacrylate, cyclohexyl acrylate, n-hexyl methacrylate, isobornyl methacrylate, isodecyl methacrylate and isodecyl acrylate.

Besides these monomers, the uncured polymerizable composition of the present invention may comprise further oligomers, polymers, copolymers and rubbers, preferably with unsaturated groups capable of polymerisation or crosslinking, or additional functional groups capable of homo- or copolymerisation. For the definition of rubber it is the referred back to the section "polymers and monomers". These oligomers, polymers, copolymers, rubbers can form or become part of a co-continuous phase and/or form inclusions in the cured adhesive matrix. Polymer inclusions can also be based on the reactive monomers described above. Usually these inclusions are in the form of phase separated domains within the co-continuous phases.

The core-shell particles were described before under the section "Polymeric inclusion" and it is referred back to this section for the purpose of disclosure.

The adhesives can contain additives imparting the desired properties such as various types of wax, inorganic fillers, hollow microspheres, hydrophobic or hydrophilic nanoclays, flame retardants, pigments, dyes, fumed silica, coupling agents, such as silanes, and adhesion promoters such as organic or inorganic acids.

The adhesives of the present invention have high adhesion towards various materials, including metals and engineering plastics. They provide engineering quality joints by adhesively bonding similar or dissimilar substrates. In particular, they improve fracture toughness.

Polymerisation Initiators

The uncured adhesive composition of the present invention is polymerised by free radicals. The radicals are usually generated by a reduction-oxidation process, whereby the reductant is compounded in one part of the adhesive and the oxidant in the other. Free radical generation and subsequent cure occurs when the two parts of the adhesive are mixed. Examples of redox systems are peroxides with tertiary aromatic amines; chlorosulfonated polyethylene with tertiary amine; sulfonyl halide with organic or inorganic acid and transition metal salt; metal ions with saccharin and/or 1-acetyl-2-phenylhydrazine. Free radicals can also be generated by oxidation of trialkylboranes. The adhesives of the present invention can contain polymerisation initiators in the form of trialkylborane complexes and decomplexing agents such as those described in WO 05/044867 A1.

C. Method of Bonding

A further object of the present invention is a method for adhesively bonding two substrates, wherein a composition comprising (A) 1-25% b.w. of the total composition of a rubber or a precursor thereof (B) 25-75% b.w. of the total composition of a monomer or monomer blend comprising acrylic or methacrylic acid or a derivative thereof (C) 1-50% b.w. of the total composition of a polyurethane or a meth (acrylated) polyurethane (D) at least one type of core shell particle is applied to surfaces and polymerised/cured via free radical polymerisation.

Preferred monomers (B) are those, which were listed under section A ("Polymers and monomers"). Preferred embodiments of the uncured compositions are those listed under section B "Uncured adhesive composition". For the purposes of disclosure it is referred back to these sections.

A preferred method uses a composition, which additionally comprises at least one type of tertiary amine. Suitable tertiary amines are aromatic tertiary amines. Preferred tertiary amines are dihydroxyethyl p-toluidine, diisopropyl p-toluidine, dimethyl p-toluidine, N,N-dimethylaniline, 2,4,6-tris[(dimethylamino)methyl]phenol.

In a preferred embodiment, free radical polymerisation is initiated by adding a composition comprising trialkylborane or trialkylborane amine complexes.

Preferred trialkyl boranes are trimethyl borane, triethyl borane, tripropyl borane, triisopropyl borane, tributyl borane and triisobutyl borane. Preferred complexes are complexes of the above trialkyl boranes with aliphatic and aromatic amines and polyamines. Most preferred complexes are based on amine compounds containing silicon, as described in WO 05/044867 A1.

In another preferred embodiment, free radical polymerisation is initiated by adding a composition comprising dibenzoyl peroxide to the uncured composition. Particularly preferred is a method, which which after curing yields compositions according to claims 1-11.

D. Dispensing Units

The adhesives of the present invention are two part and can be packaged in various ways, including two-barrel cartridges. Conveniently, one part contains the reducing agent, while the other part contains the oxidising agent. Upon mixing of the two parts, radicals are generated and the adhesive cures. Each part of the adhesive can be applied on the surfaces to be bonded in such a way that upon assembly of the joint the two parts come in contact with each other. This includes applying one part of the adhesive formulation on one surface and the second part on the other surface. Alternatively they can be applied as two beads one next to the other or one on top of the other (bead-on-bead). Preferably however the two parts are mixed together in a suitable mixer and then dispensed on one or both surfaces to be joined.

A further object of the present invention is to provide a two-part cartridge comprising one dispensing unit comprising a first composition comprising (A) 1-25% b.w. of the total composition of a rubber or a precursor thereof, (B) 25-75% b.w. of the total composition of a monomer or monomer blend comprising acrylic or methacrylic acid or a derivative thereof (C) 1-50% b.w. of the total composition of a polyurethane or a meth(acrylated) polyurethane and (D) at least one type of core shell particle, and a second dispensing unit comprising a second composition comprising at least one compound capable of inducing polymerization of said first composition.

Preferred monomers are those, which were listed under section A ("Polymers and monomers"). The expression "rubber" is defined under section A as well. Preferred embodiments of the uncured compositions are those listed under section B "Uncured adhesive composition". For the purposes of disclosure it is referred back to these sections. In a preferred embodiment of the invention, the first composition of the two-part cartridge also comprises at least one type of tertiary amine. In a further preferred embodiment, a static mixing unit attached to the two-part cartridge. The two compositions can be mixed in volume ratios which vary widely. Volume ratios used in the inventive examples were 1:1, 2:1 and 10:1, which would be suitable for commercially available cartridges and dispensing equipment. Preferred volume ratios may vary between (9-11):1, more preferably (9.5-10.5):1 and most preferably (9.8-10.2):1.

Experimental Procedures

Casting of Specimens

An adhesive formulation was combined with Agomet® Hardener Red Paste (a commercial product of Huntsman Advanced Materials, containing 22-25% b.w. of dibenzoyl peroxide) in 10:1 ratio by weight, thoroughly mixed and cast in 80 mm×80 mm×4 mm aluminium moulds for Izod testing and 80 mm×80 mm×8 mm for fracture toughness and TEM tests. The surface of the mould in contact with the adhesive was covered with adhesive backed Teflon film to avoid adhesion. The material was left to cure at room temperature. De-moulding was done after 24 hours. Specimens were machined into the required dimensions for the specific tests.

Dynamic Mechanical Thermal Spectroscopy

Specimens of size 4 mm×4 mm×10 mm were analysed in compressive mode over a temperature interval of −100° C. to +150° C., using dynamic frequency of 10 Hz, dynamic loading of 25N and thermal ramp rate of 2° C./min. The storage modulus, loss modulus and tan δ were recorded at every 3° C. interval. The temperatures corresponding to the maximum of tan δ peaks were taken as glass-transition temperatures (Tg).

Transmission Electron Microscopy (TEM)

A specimen of dimensions 3 mm×3 mm×8 mm was prepared and a pyramid microtomed at one end. The top of the pyramid was sliced with a diamond knife yielding an area of 0.1 mm×0.1 mm. The specimen was then stained with osmium tetroxide for 10 days. Once stained, ultra thin section of 80 nm to 120 nm were microtomed from the prepared surface, floated onto water and transferred to a copper grid for TEM analysis. Analysis was carried out at 120 kV using magnification ranging from 1500 to 50000, depending on the features of the sample.

Linear Elastic Fracture Mechanics Procedure for determining $K_{1c}$ and $G_{1c}$ A specimen of dimensions b×w×l=7.5 mm×15 mm×65 mm was prepared. A notch was machined to a depth of 5 mm at the 32.5 mm midpoint. Just prior to testing a sharp notch was introduced into the machined area using a new razor blade. The total notch depth is constrained within 6.75-8.25 mm. The notched specimen was tested in a three-point bend configuration. Test span of 60 mm and crosshead speed of 10 mm/min were used. The test was carried out in compression and proceeded until fracture occured or until a hinge was formed if the material was very tough. The test and calculations were carried out in strict observance of the Linear Elastic Fracture Mechanics Standard for Determination of $K_{1c}$ and $G_{1c}$ for Plastics, March 1990, European Structural Integrity Society. The test was carried out at minus 40° C. The average result of 5 test specimens is being reported.

Notched Izod Impact Strength

Notched Izod impact strength was carried out at room temperature (23° C.) following ISO 180-1982(E), using specimen type 4 with notch type A.

The average result of 5 test specimens is being reported.

Adhesive Strength Determination

The plastic specimens' size was 85 mm×25 mm×3 mm. The plastic substrates were degreased by wiping with isopropanol. The aluminium specimen's size was 114 mm×25 mm×1.6 mm. The aluminium substrates were degreased with trichloroethylene, sandblasted and rinsed with acetone. The adhesive composition was dispensed onto one surface of the substrate pair. The two surfaces were mated and held to each other with a compressor-type tubing clamp. The overlap area was 25.0 mm×12.5 mm for the aluminium specimens and 25.0 mm×5.0 mm for the plastic specimens. Small amounts of adhesive filet squeezed out of the overlapped area were allowed to remain. The bonded joints were left to cure for 24 h at 23° C. The clamps were then removed and the bonded joints were tested for tensile shear strength (TSS) according to ISO 4587 at crosshead speed of 15 mm/min for the aluminium joints and 10 mm/min for the plastic joints. The TSS values were recorded in megapascals (MPa). The average value of 5 tested joints is reported.

The Aluminium Lap Shears at −40° C. are measured the same way as before (i.e. overlap of 25×12.5 mm, cure 24 hrs at 23° C., and pulled at crosshead speed of 15 mm/min) except the lap shear joint is held in the jig for 10 min to allow to get to −40° C. before the joint is pulled. The jig is surrounded by an insulated surround cover which is at −40° C. using liquid nitrogen.

Materials

The following materials were used in preparation of the example formulations:

MMA: methyl methacrylate, obtained from Aldrich

MA: methacrylic acid, obtained from Aldrich

MAPU: methacrylated polyurethane, based on reaction product of poly(tetrahydrofurane), with molecular weight 1000, and tolylene 2,4-diisocyanate (TDI) which product is end capped with hydroxyethyl methacrylate. Synthesis of MAPU was carried out in accordance with the teachings of U.S. Pat. No. 3,873,643. The product is diluted with 10% by weight of methyl methacrylate.

CBN: partially carboxylated butadiene-nitrile rubber, obtained as Nipol® 1072CG from Zeon Chemicals, USA EGMP: ethylene glycol methacrylate phosphate, obtained from Aldrich DHEPT: N,N-Bis-(2-hydroxyethyl) p-toluidine, obtained from Roehm GmbH, Germany TDMAMP: 2,4,6-tris[(dimethylamino)methyl]phenol, obtained from Aldrich C140: Metablen C140, MBS core-shell particle impact modifier manufactured by AtoFina C350: Metablen C350, MBS core-shell particle impact modifier manufactured by AtoFina E901: Metablen E901, MBS core-shell particle impact modifier manufactured by AtoFina Agomet® Hardener Red Paste: commercial product of Huntsman Advanced Materials containing 22-25% dibenzoyl peroxide.

Stabilisers: chloranilic acid, obtained from Aldrich and Irganox® 1330, obtained from Ciba Specialty Chemicals, Switzerland.

Uncured, Polymerizable Adhesive Preparation (General Procedure)

CBN was dissolved in MMA using a high-speed disperser. To this solution was added MAPU and the mixture was stirred until a homogeneous solution was obtained. MBS core-shell particles were added and dispersed until a homogeneous product resulted. Subsequently, TDMAMP, DHEPT and stabilisers were added and the mixture homogenised. Finally, MA and EGMP were added and the mixture homogenized. The temperature during mixing should not exceed 60° C.

To prepare samples for testing or adhesive bonded joints the polymerizable adhesive and Agomet® Hardener Red Paste were mixed in 10:1 ratio by weight.

EXAMPLES

Comparative Example 1

An adhesive was prepared as described above by mixing the following ingredients in the specified quantities:

MMA—263.22 g
MA—15.00 g
EGMP—10.50 g
OHEPT—8.25 g
TDMAMP—3.00 g
Stabilisers: 0.03 g The cured adhesive showed a single Tg at 120° C. $G_{1c}$ at −40° C. was 99 J/m². Notched Izod at room temperature was 1.3 kJ/m². Tensile shear strength for aluminium bonded joints was 7 MPa at 23° C. and 4 MPa at −40° C.

TEM as shown in FIG. 1 revealed a featureless homogeneous structure.

Comparative Example 2

The adhesive was prepared as described above by mixing the following ingredients in the specified quantities:
MMA—203.22 g
MA—15.00 g
EGMP—10.50 g
DHEPT—8.25 g
TDMAMP—3.00 g
C140—60.00 g
Stabilisers—0.03 g The cured adhesive showed a single Tg at 115° C. $G_{1c}$ at −40° C. was measured to be 183 J/m². Notched Izod at room temperature was determined to be 1.5 kJ/m². Tensile shear strength for aluminium bonded joints was 22 MPa at 23° C. and 10 MPa at −40° C.

TEM revealed featureless homogeneous matrix into which were dispersed spherical particles of 80 microns in diameter, all particles individually dispersed.

Comparative Example 3

The adhesive was prepared as described above by mixing the following ingredients in the specified quantities:
MMA—203.22 g
MA—15.00 g
EGMP—10.50 g
DHEPT—8.25 g
TDMAMP—3.00 g
E901—60.00 g
Stabilisers—0.03 g The cured adhesive showed two Tg at −70° C. and +112° C. $G_{1c}$ at −40° C. was measured to be 974 J/m². Notched Izod at room temperature was determined to be 3.8 kJ/m². Tensile shear strength for aluminium bonded joints was 22 MPa at 23° C. and 23 MPa at −40° C.

TEM revealed featureless homogeneous matrix into which were dispersed spherical particles 80 microns in diameter, individually dispersed or dispersed as agglomerates of particles measuring an average of 500 nm.

Comparative Example 4

The adhesive was prepared as described above by mixing the following ingredients in the specified quantities:
MMA—179.41 g
MAPU—83.81 g
MA—15.00 g
EGMP—10.50 g
DHEPT—8.25 g
TDMAMP—3.00 g
Stabilisers—0.03 g The cured adhesive showed a single Tg at 90° C. $G_{1c}$ at −40° C. was measured to be 517 J/m². Notched Izod at room temperature was determined to be 1.5 kJ/m². Tensile shear strength for aluminium bonded joints was 25 MPa at 23° C. and 17 MPa at −40° C.

TEM as shown in FIGS. 2 and 3 revealed a co-continuous phase matrix.

Comparative Example 5

The adhesive was prepared as described above by mixing the following ingredients in the specified quantities:
MMA—179.37 g
MAPU—55.20 g
CBN—34.50 g
MA—15.00 g
EGMP—10.50 g
DHEPT—2.40 g
TDMAMP—3.00 g
Stabilisers—0.03 g The cured adhesive showed a single Tg at 101° C. $G_{1c}$ at −40° C. was measured to be 1987 J/m². Notched Izod at room temperature was determined to be 2.9 kJ/m².

TEM revealed a co-continuous phase matrix into which were dispersed phase separated spherical rubber domains of sizes in the 100 nm to 1-micron range.

Example 1

The adhesive was prepared as described above by mixing the following ingredients in the specified quantities:
MMA—104.79 g
MAPU—83.43 g
MA—15.00 g
EGMP—10.50 g
DHEPT—8.25 g
TDMAMP—3.00 g
C350—75.00 g
Stabilisers—0.03 g The cured adhesive showed two Tg at −36° C. and +67° C. $G_{1c}$ at −40° C. was measured to be 2360 J/m². Notched Izod at room temperature was determined to be 39.6 kJ/m². Tensile shear strength for aluminium bonded joints was 14 MPa at 23° C. and 37 MPa at −40° C.

TEM revealed a co-continuous phase matrix into which were dispersed spherical particles 80 microns in diameter, individually dispersed or dispersed as agglomerates of particles measuring an average of 500 nm. The matrix also contained spherical domains of polymethylmethacrylate with size 1 to 3 microns.

Example 2

The adhesive was prepared as described above by mixing the following ingredients in the specified quantities:
MMA—161.51 g
MAPU—55.30 g
CBN—26.07 g
MA—15.00 g
EGMP—10.50 g
DHEPT—2.49 g
TDMAMP—3.00 g
C350—26.10 g
Stabilisers—0.03 g The cured adhesive showed a single Tg at 100° C. $G_{1c}$ at −40° C. was measured to be 2770 J/m². Notched izod at room temperature was determined to be 8.2 kJ/m². Tensile shear strength for aluminium bonded joints was 32 MPa at 23° C. and 40 MPa at −40° C.

TEM revealed a co-continuous phase matrix into which were dispersed spherical particles 80 microns in diameter, individually dispersed or dispersed as agglomerates of particles measuring an average of 500 nm, also phase separated spherical rubber domains of sizes in the 2 to 3-micron range, also spherical domains of polymethylmethacrylate with size 1 to 3 microns.

Example 3

The adhesive was prepared as described above by mixing the following ingredients in the specified quantities:
MMA—136.14 g
MAPU—89.73 g
CBN—34.56 g
MA—15.00 g
EGMP—10.50 g
DHEPT—2.49 g
TDMAMP—3.00 g
C350—8.55 g
Stabilisers—0.03 g The cured adhesive showed a single Tg at 90° C. $G_{1c}$ at −40° C. was measured to be 5435 J/m². Notched Izod at room temperature was determined to be 18.6 kJ/m². Tensile shear strength for aluminium bonded joints was 25 MPa at 23° C. and 39 MPa at −40° C.

TEM as shown in FIG. 4 revealed a co-continuous phase matrix into which were dispersed spherical particles 80 microns in diameter, individually dispersed or dispersed as agglomerates of particles measuring an average of 500 nm, also phase separated spherical rubber domains of sizes in the 100 nm 1-micron range, also spherical domains of polymethylmethacrylate with size 1 to 3 microns.

Table 1

The results of the preceding examples and comparative examples have been summarised for clarity in Table 1.

Example 4

The adhesive was prepared as described above by mixing the following ingredients in the specified quantities:
MMA—136.71 g
MAPU—83.43 g
CBN—34.53 g
MA—15.00 g
EGMP—10.50 g
DHEPT—8.25 g
TDMAMP—3.00 g
C350—8.55 g
Stabilisers—0.03 g The cured adhesive showed a single Tg at 85° C. $G_{1c}$ at −40° C. was measured to be 4239 J/m². Notched Izod at room temperature was determined to be 21.0 kJ/m². Tensile shear strength for aluminium bonded joints was 25 MPa at 23° C. and 37 MPa at −40° C.

TEM revealed a co-continuous phase matrix into which were dispersed spherical particles 80 microns in diameter, individually dispersed or dispersed as agglomerates of particles measuring an average of 500 nm, also phase separated spherical rubber domains of sizes in the 100 nm 1-micron range, also spherical domains of polymethylmethacrylate with size 1 to 3 microns.

The adhesive was used to make adhesive bonded joints following the described procedure.

The results are presented in Table 2.

TABLE 2

| Substrate | Tensile Shear Strength (MPa) | Failure type |
|---|---|---|
| Aluminium/Aluminium | 25.3 | Cohesive failure within the adhesive |

TABLE 1

| Adhesive | Tg (° C.) | $G_{1c}$ at (−40° C.) (J/m²) | Izod at 23° C. (kJ/m²) | TSSAt 23° C. (MPa) | TSSAt −40° C. (MPa) | Co-continuous matrix | Details of matrix | Nr of inclusions | Details of inclusions |
|---|---|---|---|---|---|---|---|---|---|
| Comp. Ex. 1 | 120° C. | 99 | 1.3 | 7 | 4 | No | — | 0 | |
| Comp. Ex. 2 | 115° C. | 183 | 1.5 | 22 | 10 | No | — | 1 | Monodisperse spherical particles 80 nm in diameter. Dispersed individually. |
| Comp. Ex. 3 | −70° C. 112° C. | 974 | 3.8 | 23 | 23 | No | — | 1 | Monodisperse spherical particles 80 nm in diameter. Dispersed individually or as agglomerates of 500 nm. |
| Comp. Ex. 4 | 90° C. | 517 | 1.5 | 25 | 17 | Yes | PMMA + PU | 0 | |
| Comp. Ex. 5 | 101° C. | 1987 | 2.9 | | | Yes | PMMA + PU + CBN | 1 | Spherical phase separated rubber domain of sizes 100 nm to 1 micron. |
| Ex. 1 | −36° C. 67° C. | 2360 | 39.6 | 14 | 37 | Yes | PMMA + PU | 2 | Monodisperse spherical particles 80 nm in diameter. Dispersed individually or as agglomerates of 500 nm. PMMA inclusions of size 1 to 3 microns. |
| Ex. 2 | 100° C. | 2770 | 8.2 | 32 | 40 | Yes | PMMA + PU + CBN | 3 | Monodisperse spherical particles 80 nm in diameter. Dispersed individually or as agglomerates of 500 nm. Spherical phase separated rubber domains of size 2 to 3 microns. PMMA inclusions of size 1 to 3 microns. |
| Ex. 3 | 90° C. | 5435 | 18.6 | 25 | 39 | Yes | PMMA + PU + CBN | 3 | Monodisperse spherical particles 80 nm in diameter. Dispersed individually or as agglomerates of 500 nm. Spherical phase separated rubber domains of size 2 to 3 microns. PMMA inclusions of size 1 to 3 microns. |

TABLE 2-continued

| Substrate | Tensile Shear Strength (MPa) | Failure type |
|---|---|---|
| Polycarbonate/Polycarbonate | 12.7 | Mixed (substrate failure and adhesive failure) |
| PVC/PVC | 11.8 | Substrate failure |
| ABS/ABS | 12.2 | Mixed (substrate failure and adhesive failure) |

ABS = Acrylonitrile butadiene styrene copolymer
PVC = poly vinyl chloride

The invention claimed is:

1. A cured (meth)acrylate based adhesive composition, comprising at least two co-continuous phases of interpenetrating networks and at least two types of polymeric inclusions, one of the co-continuous phases comprising a polymer of at least one acrylic or methacrylic acid monomer or of a derivative thereof and an acrylate- or methacrylate-derivatised polyurethane and another of the co-continuous phases comprises a rubber polymer, wherein at least one type of the polymeric inclusions is of particulate nature and the polymeric inclusions of particulate nature are core shell particles at an amount of 2-10% by weight based on the total weight of the composition.

2. Composition according to claim 1 wherein the rubber polymer comprises a carboxylated butadiene-nitrile rubber.

3. Composition according to claim 1, wherein the core shell poly(acrylonitrile-co-butadiene-co-styrene), polystyrene-block-polybutadiene-block-polystyrene or polystyrene-block-polybutadiene-block-polymethylmethacrylate, poly (siloxane-co-methylmethacrylate), poly(butylmethacrylate-co-methylmethacrylate) or any mixture thereof.

4. Composition according to claim 1 wherein at least one type of the polymeric inclusions has domain structure.

5. Composition according to claim 4, wherein the polymeric inclusions having domain structure comprise polymers selected from rubber, poly(meth)acrylate homo- or copolymer, polyurethane homo- or copolymer, polysiloxane homo- or copolymer, polyolefin homo- or copolymer or a mixture thereof.

6. Composition according to claim 4 wherein the polymeric inclusions having domain structure have an average diameter ranging between 100 nm to 10 microns.

7. Composition according to claim 4 wherein polymeric inclusions having domain structure result from phase separation during adhesive cure.

8. Composition according to claim 4 wherein the polymeric inclusions are a combination of core shell particles and phase separated polymers.

* * * * *